United States Patent
Li

(10) Patent No.: US 11,263,132 B2
(45) Date of Patent: Mar. 1, 2022

(54) METHOD AND SYSTEM FOR FACILITATING LOG-STRUCTURE DATA ORGANIZATION

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/898,826

(22) Filed: Jun. 11, 2020

(65) Prior Publication Data

US 2021/0390048 A1    Dec. 16, 2021

(51) Int. Cl.
*G06F 12/00* (2006.01)
*G06F 12/06* (2006.01)
(Continued)

(52) U.S. Cl.
CPC ...... *G06F 12/0646* (2013.01); *G06F 9/30047* (2013.01); *G06F 12/0833* (2013.01);
(Continued)

(58) Field of Classification Search
CPC .............. G06F 12/0646; G06F 16/164; G06F 16/1824; G06F 9/30047; G06F 12/0833;
(Continued)

(56) References Cited

U.S. PATENT DOCUMENTS 3,893,071 A   7/1975 Bossen
4,562,494 A   12/1985 Bond
(Continued)

FOREIGN PATENT DOCUMENTS

| JP | 2003022209 | 1/2003 |
|----|------------|--------|
| JP | 2011175422 | 9/2011 |
| WO | 9418634    | 8/1994 |
| WO | 1994018634 | 8/1994 |

OTHER PUBLICATIONS https://web.archive.org/web/20071130235034/http://en.wikipedia.org:80/wiki/logical_block_addressing Wikipedia screen shot retriefed on wayback Nov. 20, 2007 showing both physical and logical addressing used historically to access data on storage devices (Year: 2007).

(Continued)

*Primary Examiner* — Gurtej Bansal
(74) *Attorney, Agent, or Firm* — Shun Yao; Yao Legal Services, Inc.

(57) ABSTRACT

One embodiment provides a system which facilitates organization of data. During operation, the system identifies an original data chunk stored in a non-volatile memory of a storage device, wherein the original data chunk is a logical chunk which includes original logical block addresses. The system stores a first mapping of the original logical block addresses to original physical block addresses in a first data structure. The system assigns new logical block addresses to be included in a new data chunk. The system creates, in a second data structure based on an order of the assigned new logical block addresses, a mapping of the new logical block addresses to valid original logical block addresses. The system stores, based on the first data structure and the second data structure, a second mapping of the new logical block addresses to the original physical block addresses.

18 Claims, 10 Drawing Sheets

(51) Int. Cl.
  *G06F 12/0831* (2016.01)
  *G06F 12/0882* (2016.01)
  *G06F 9/30* (2018.01)
  *G06F 16/182* (2019.01)
  *G06F 16/16* (2019.01)
  *G06F 12/14* (2006.01)

(52) U.S. Cl.
  CPC ...... *G06F 12/0882* (2013.01); *G06F 12/1408* (2013.01); *G06F 16/164* (2019.01); *G06F 16/1824* (2019.01); *G06F 2212/7201* (2013.01)

(58) Field of Classification Search
  CPC ............. G06F 12/0882; G06F 12/1408; G06F 2212/7201
  See application file for complete search history.

(56) References Cited

U.S. PATENT DOCUMENTS

| | | | |
|---|---|---|---|
| 4,718,067 A | 1/1988 | Peters | |
| 4,775,932 A | 10/1988 | Oxley | |
| 4,858,040 A | 8/1989 | Hazebrouck | |
| 5,394,382 A | 2/1995 | Hu | |
| 5,602,693 A | 2/1997 | Brunnett | |
| 5,715,471 A | 2/1998 | Otsuka | |
| 5,732,093 A | 3/1998 | Huang | |
| 5,802,551 A | 9/1998 | Komatsu | |
| 5,930,167 A | 7/1999 | Lee | |
| 6,098,185 A | 8/2000 | Wilson | |
| 6,148,377 A | 11/2000 | Carter | |
| 6,226,650 B1 | 5/2001 | Mahajan et al. | |
| 6,243,795 B1 | 6/2001 | Yang | |
| 6,457,104 B1 | 9/2002 | Tremaine | |
| 6,658,478 B1 | 12/2003 | Singhal | |
| 6,795,894 B1 | 9/2004 | Neufeld | |
| 7,351,072 B2 | 4/2008 | Muff | |
| 7,565,454 B2 | 7/2009 | Zuberi | |
| 7,599,139 B1 | 10/2009 | Bombet | |
| 7,953,899 B1 | 5/2011 | Hooper | |
| 7,958,433 B1 | 6/2011 | Yoon | |
| 8,085,569 B2 | 12/2011 | Kim | |
| 8,144,512 B2 | 3/2012 | Huang | |
| 8,166,233 B2 | 4/2012 | Schibilla | |
| 8,260,924 B2 | 9/2012 | Koretz | |
| 8,281,061 B2 | 10/2012 | Radke | |
| 8,452,819 B1 | 5/2013 | Sorenson, III | |
| 8,516,284 B2 | 8/2013 | Chan | |
| 8,527,544 B1 | 9/2013 | Colgrove | |
| 8,751,763 B1 | 6/2014 | Ramarao | |
| 8,819,367 B1 | 8/2014 | Fallone | |
| 8,825,937 B2 | 9/2014 | Atkisson | |
| 8,832,688 B2 | 9/2014 | Tang | |
| 8,868,825 B1 | 10/2014 | Hayes | |
| 8,904,061 B1 | 12/2014 | O'Brien, III | |
| 8,949,208 B1 | 2/2015 | Xu | |
| 9,015,561 B1 | 4/2015 | Hu | |
| 9,031,296 B2 | 5/2015 | Kaempfer | |
| 9,043,545 B2 | 5/2015 | Kimmel | |
| 9,088,300 B1 | 7/2015 | Chen | |
| 9,092,223 B1 | 7/2015 | Pani | |
| 9,129,628 B1 | 9/2015 | Fallone | |
| 9,141,176 B1 | 9/2015 | Chen | |
| 9,208,817 B1 | 12/2015 | Li | |
| 9,213,627 B2 | 12/2015 | Van Acht | |
| 9,213,632 B1* | 12/2015 | Song | G06F 12/0246 |
| 9,280,472 B1 | 3/2016 | Dang | |
| 9,280,487 B2 | 3/2016 | Candelaria | |
| 9,311,939 B1 | 4/2016 | Malina | |
| 9,336,340 B1 | 5/2016 | Dong | |
| 9,436,595 B1 | 9/2016 | Benitez | |
| 9,495,263 B2 | 11/2016 | Pang | |
| 9,529,601 B1 | 12/2016 | Dharmadhikari | |
| 9,529,670 B2 | 12/2016 | O'Connor | |
| 9,575,982 B1 | 2/2017 | Sankara Subramanian | |
| 9,588,698 B1 | 3/2017 | Karamcheti | |
| 9,588,977 B1 | 3/2017 | Wang | |
| 9,607,631 B2 | 3/2017 | Rausch | |
| 9,671,971 B2 | 6/2017 | Trika | |
| 9,747,202 B1 | 8/2017 | Shaharabany | |
| 9,852,076 B1 | 12/2017 | Garg | |
| 9,875,053 B2 | 1/2018 | Frid | |
| 9,912,530 B2 | 3/2018 | Singatwaria | |
| 9,946,596 B2 | 4/2018 | Hashimoto | |
| 10,013,169 B2 | 7/2018 | Fisher | |
| 10,199,066 B1 | 2/2019 | Feldman | |
| 10,229,735 B1 | 3/2019 | Natarajan | |
| 10,235,198 B2 | 3/2019 | Qiu | |
| 10,268,390 B2 | 4/2019 | Warfield | |
| 10,318,467 B2 | 6/2019 | Barzik | |
| 10,361,722 B2 | 7/2019 | Lee | |
| 10,437,670 B1 | 10/2019 | Koltsidas | |
| 10,459,663 B2 | 10/2019 | Agombar | |
| 10,642,522 B2 | 5/2020 | Li | |
| 10,649,657 B2 | 5/2020 | Zaidman | |
| 10,678,432 B1 | 6/2020 | Dreier | |
| 10,756,816 B1 | 8/2020 | Dreier | |
| 10,928,847 B2 | 2/2021 | Suresh | |
| 2001/0032324 A1 | 10/2001 | Slaughter | |
| 2002/0010783 A1 | 1/2002 | Primak | |
| 2002/0039260 A1 | 4/2002 | Kilmer | |
| 2002/0073358 A1 | 6/2002 | Atkinson | |
| 2002/0095403 A1 | 7/2002 | Chandrasekaran | |
| 2002/0112085 A1 | 8/2002 | Berg | |
| 2002/0161890 A1 | 10/2002 | Chen | |
| 2003/0074319 A1 | 4/2003 | Jaquette | |
| 2003/0145274 A1 | 7/2003 | Hwang | |
| 2003/0163594 A1 | 8/2003 | Aasheim | |
| 2003/0163633 A1 | 8/2003 | Aasheim | |
| 2003/0217080 A1 | 11/2003 | White | |
| 2004/0010545 A1 | 1/2004 | Pandya | |
| 2004/0066741 A1 | 4/2004 | Dinker | |
| 2004/0103238 A1 | 5/2004 | Avraham | |
| 2004/0143718 A1 | 7/2004 | Chen | |
| 2004/0255171 A1 | 12/2004 | Zimmer | |
| 2004/0267752 A1 | 12/2004 | Wong | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0138325 A1 | 6/2005 | Hofstee | |
| 2005/0144358 A1 | 6/2005 | Conley | |
| 2005/0149827 A1 | 7/2005 | Lambert | |
| 2005/0174670 A1 | 8/2005 | Dunn | |
| 2005/0177672 A1 | 8/2005 | Rao | |
| 2005/0177755 A1 | 8/2005 | Fung | |
| 2005/0195635 A1 | 9/2005 | Conley | |
| 2005/0235067 A1 | 10/2005 | Creta | |
| 2005/0235171 A1 | 10/2005 | Igari | |
| 2006/0031709 A1 | 2/2006 | Hiraiwa | |
| 2006/0101197 A1 | 5/2006 | Georgis | |
| 2006/0156012 A1 | 7/2006 | Beeson | |
| 2006/0184813 A1 | 8/2006 | Bui | |
| 2007/0033323 A1 | 2/2007 | Gorobets | |
| 2007/0061502 A1 | 3/2007 | Lasser | |
| 2007/0101096 A1 | 5/2007 | Gorobets | |
| 2007/0204128 A1* | 8/2007 | Lee | G06F 12/0246 711/173 |
| 2007/0250756 A1 | 10/2007 | Gower | |
| 2007/0266011 A1 | 11/2007 | Rohrs | |
| 2007/0283081 A1 | 12/2007 | Lasser | |
| 2007/0283104 A1 | 12/2007 | Wellwood | |
| 2007/0285980 A1 | 12/2007 | Shimizu | |
| 2008/0034154 A1 | 2/2008 | Lee | |
| 2008/0065805 A1 | 3/2008 | Wu | |
| 2008/0082731 A1 | 4/2008 | Karamcheti | |
| 2008/0112238 A1 | 5/2008 | Kim | |
| 2008/0163033 A1 | 7/2008 | Yim | |
| 2008/0301532 A1 | 12/2008 | Uchikawa | |
| 2009/0006667 A1 | 1/2009 | Lin | |
| 2009/0089544 A1 | 4/2009 | Liu | |
| 2009/0113219 A1 | 4/2009 | Aharonov | |
| 2009/0125788 A1 | 5/2009 | Wheeler | |
| 2009/0183052 A1 | 7/2009 | Kanno | |
| 2009/0254705 A1 | 10/2009 | Abali | |

(56) References Cited

U.S. PATENT DOCUMENTS

| | | |
|---|---|---|
| 2009/0282275 A1 | 11/2009 | Yermalayeu |
| 2009/0287956 A1 | 11/2009 | Flynn |
| 2009/0307249 A1 | 12/2009 | Koifman |
| 2009/0307426 A1 | 12/2009 | Galloway |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161621 A1* | 6/2011 | Sinclair ............... G06F 12/0246 711/207 |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | Mcwilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0078245 A1* | 3/2016 | Amarendran ....... H04L 63/0428 713/193 |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0132237 A1 | 5/2016 | Jeong |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306699 A1 | 10/2016 | Resch |

(56) References Cited

U.S. PATENT DOCUMENTS

| | | |
|---|---|---|
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Jung |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Filip |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0034454 A1* | 1/2019 | Gangumalla ......... G06F 16/185 |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0317901 A1 | 10/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0097189 A1 | 3/2020 | Tao |
| 2020/0143885 A1 | 5/2020 | Kim |
| 2020/0159425 A1 | 5/2020 | Flynn |
| 2020/0167091 A1 | 5/2020 | Haridas |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0387327 A1 | 12/2020 | Hsieh |
| 2020/0401334 A1 | 12/2020 | Saxena |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1 | 4/2021 | Choi |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741 >. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST'11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

(56) References Cited

OTHER PUBLICATIONS

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime, "Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

C. Wu, D. Wu, H. Chou and C. Cheng, "Rethink the Design of Flash Translation Layers in a Component-Based View", in IEEE Acess, vol. 5, p. 12895-12912, 2017.

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

ARM ("Cortex-R5 and Cortex-R5F", Technical reference Manual, Revision r1p1) (Year:2011).

\* cited by examiner

METHOD AND SYSTEM FOR FACILITATING LOG-STRUCTURE DATA ORGANIZATION

BACKGROUND

Field

This disclosure is generally related to the field of data storage. More specifically, this disclosure is related to a method and system for facilitating log-structured data organization.

Related Art

Today, various storage systems are being used to store and access the ever-increasing amount of digital content. A storage system can include various storage devices which can provide persistent memory, e.g., a solid state drive (SSD) and a hard disk drive (HDD). A distributed file system is one type of storage system, and in a log-structured distributed file system, data is written sequentially and in a circular fashion to a storage media, generally without support for in-place overwrites. The write pointer can move until the end of the capacity of the storage media, and can loop back to the beginning to continue writing data. This type of writing can result in scattered data chunks with "holes" or gaps of data in the storage media. The file system may frequently compact the data chunks with holes in order to more efficiently utilize the capacity of the storage media. During compaction, the system identifies valid data portions from multiple data chunks, and copies the valid data portions to new data chunks. At the file system level, new metadata is generated for these copy operations, and new logical block addresses (LBAs) are assigned to the respectively copied data. These operations can result in an increased write amplification. At the storage device level (e.g., at an SSD level), a significant amount of data is moved from one physical location to another, which can increase the wear-leveling of the storage media. At the same time, metadata is stored in the non-volatile memory, and can consume resources at both the firmware and hardware level. The consistency of the metadata is essential to provide sufficient reliability for the SSD in handling the risk of data loss. Thus, reducing both the write amplification and the risk of data loss can be important features of an overall storage system.

SUMMARY

One embodiment provides a system which facilitates organization of data. During operation, the system identifies an original data chunk stored in a non-volatile memory of a storage device, wherein the original data chunk is a logical chunk which includes original logical block addresses. The system stores a first mapping of the original logical block addresses to original physical block addresses in a first data structure. The system assigns new logical block addresses to be included in a new data chunk. The system creates, in a second data structure based on an order of the assigned new logical block addresses, a mapping of the new logical block addresses to valid original logical block addresses. The system stores, based on the first data structure and the second data structure, a second mapping of the new logical block addresses to the original physical block addresses.

In some embodiments, the second mapping of the new logical block addresses to the original physical block addresses is stored in a mapping table in a non-volatile memory of the host.

In some embodiments, in response to determining that a predetermined time period has passed, the system performs the following operations: the system encrypts the mapping table stored in the non-volatile memory of the host; and the system flushes the encrypted mapping table to the non-volatile memory of the storage device.

In some embodiments, the mapping table comprises the first data structure. The system stores the second mapping of the new logical block addresses to the original physical block addresses by: updating a first entry in the first data structure, wherein the first entry corresponds to a first original physical block address which is mapped to a first valid original logical block address, by replacing the first valid original logical block address with a first new logical block address based on the mapping in the second data structure; and discarding the first valid original logical block address.

In some embodiments, prior to creating, in the second data structure based on the assigned new logical block addresses, the mapping of the new logical block addresses to the valid original logical block addresses, the system performs the following operations: the system detects an ongoing garbage collection process associated with the identified original data chunk; and the system updates, by a flash translation layer in the mapping table, physical block addresses corresponding to the original logical block addresses included in the original data chunk.

In some embodiments, the methods or operations are performed by a distributed file system as part of a compaction procedure.

In some embodiments, the assigned new logical block addresses are assigned in a continuous or sequential range.

In some embodiments, the system creates, in the second data structure based on the assigned new logical block addresses, the mapping of the new logical block addresses to the valid original logical block addresses by: arranging the valid original logical block addresses to align with the assigned new logical block addresses; and mapping a respective valid original logical block address to an aligned respective new logical block address.

In some embodiments, the system stores the second mapping of the new logical block addresses to the original physical block addresses by: merging the first data structure and the second data structure to create a bridge between the new logical block addresses and the original physical block addresses through the original logical block addresses.

In some embodiments, data is stored in the non-volatile memory of the storage device in physical pages in a block of data of the non-volatile memory of the storage device. A physical page does not include logical block addresses which correspond to data stored in the physical page, and the block does not include a log of logical block addresses which correspond to data stored in the physical pages of the block.

In some embodiments, the system receives, by a distributed file system, multiple data from multiple users to be written to non-volatile memory of a plurality of storage devices. The system generates, by a flash translation layer, metadata associated with the multiple data. The system stores the generated metadata in a non-volatile memory of the host. The system accumulates the multiple data in a data buffer of the non-volatile memory of the host to fill a large physical page of a predetermined size. The system writes the filled large physical page to the non-volatile memory of at least one of the plurality of storage devices. In response to determining that a predetermined time period has passed, the system flushes an encrypted copy of the metadata to the non-volatile memory of a first storage device.

BRIEF DESCRIPTION OF THE FIGURES

In the figures, like reference numerals refer to the same figure elements.

DETAILED DESCRIPTION

Figure 1:
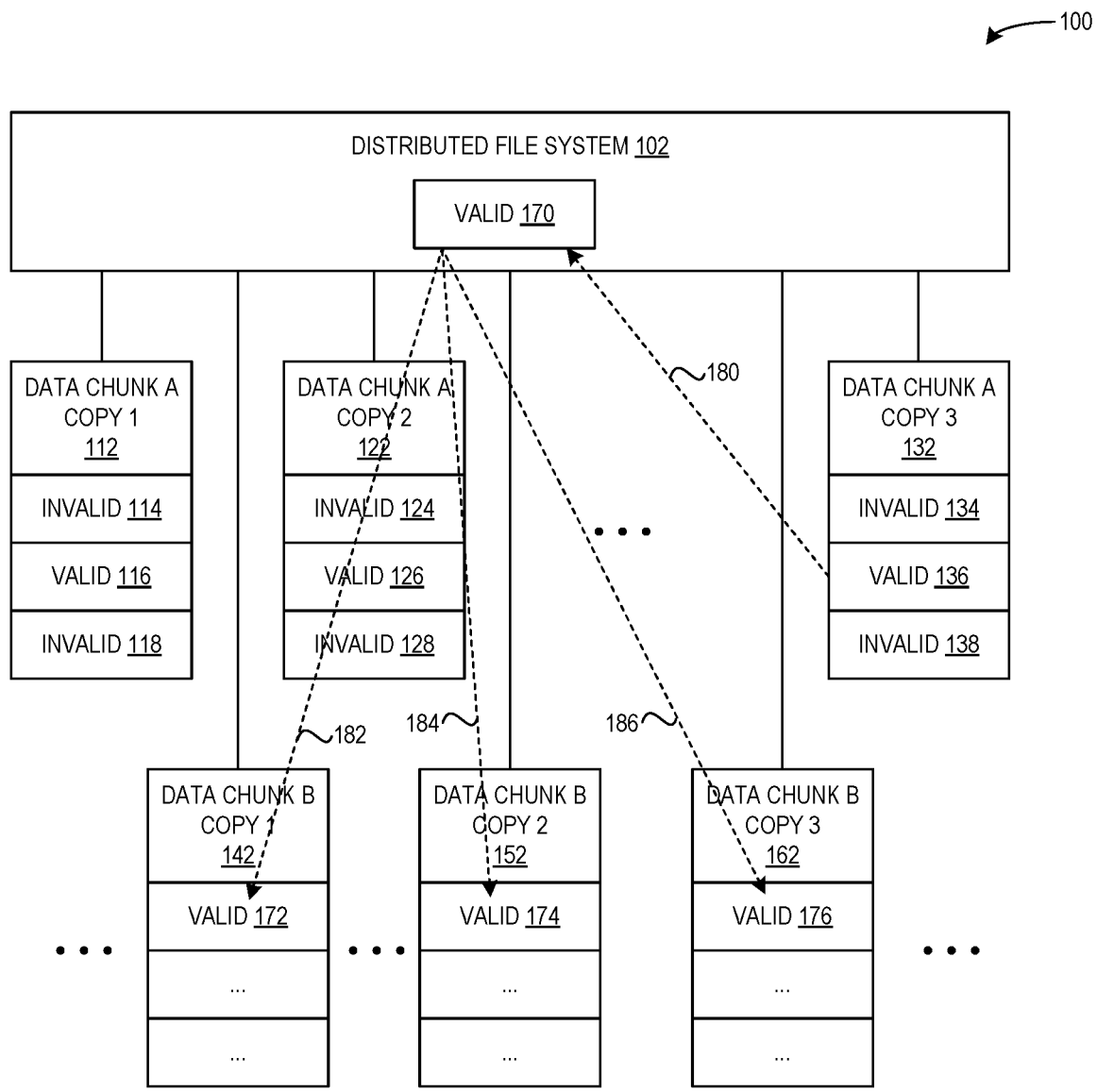
FIG. 1 illustrates an architecture of an exemplary distributed file system, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate organization and management of data and metadata which can mitigate write amplification during the operation of a distributed file system.

As described above, in a log-structured distributed file system, data is written sequentially and in a circular fashion to a storage media, generally without support for in-place overwrites, which can result in scattered data chunks with holes or gaps of data in the storage media. The file system may frequently compact the data chunks with holes in order to more efficiently utilize the capacity of the storage media. However, the compaction process performed by a conventional distributed file system can involve copying valid data portions to multiple new data chunks (as multiple copies or replicas), and generating new LBAs for the data. This can result in both an increased write amplification at the file system level and an increased wear-leveling at the storage device level. Furthermore, metadata which is stored in the non-volatile memory can consume resources at both the firmware and hardware level, as the consistency of the metadata is essential to provide sufficient reliability for the storage device in handling the risk of data loss. Thus, reducing both the write amplification and the risk of data loss can be important features of an overall storage system. An exemplary conventional distributed file system is described below in relation to FIG. 1.

The embodiments described herein address these issues by providing a system which, instead of using the high-cost and volatile DRAM to store and manage metadata and mapping table information, uses a persistent memory as the system memory. Examples of persistent memory include, but are not limited to, phase change memory (PCM), resistive RAM (ReRAM), and magnetoresistive RAM (MRAM). This persistent memory can support in-place overwrites and can include an enlarged memory capacity sufficient to store the metadata for a cluster or group of high-capacity storage drives (e.g., SSDs). An exemplary server is described below in relation to FIG. 2.

During compaction, the system can maintain data at an original physical location, but map the original LBA to a newly assigned LBA, which is allocated by the distributed file system. Because of this mapping, the system can save capacity or space in the memory by eliminating the need to store LBAs with a given physical page and in an LBA journal or log for a given NAND block (referred to as "redundant protection"). An exemplary compaction environment is described below in relation to FIG. 3, and the removal of redundant protection is described below in relation to FIG. 4. An exemplary write operation is described below in relation to FIG. 5.

Thus, embodiments described herein provide a system which uses a persistent memory as the system memory, which can provide a savings in the both the cost and volatile nature of DRAM generally used for system memory. In addition, by maintaining data at an original physical location (i.e., original PBA) and storing a mapping of the original LBA to the original LBA, and by using a mapping of the original LBA to a newly assigned LBA, the system can use the original LBA as a "bridge" to merge the original LBA to original PBA mapping and the original LBA to the new LBA. The system can thus obtain and store a mapping of the new LBA to the original PBA, which allows the system to eliminate storage of both page-level LBAs and block-level LBA logs/journals (i.e., removal of the redundant protection). These improvements can result in a decreased write amplification, which in turn can result in improvements in the efficiency, lifespan, and performance of a storage system.

A "storage system infrastructure," "storage infrastructure," or "storage system" refers to the overall set of hardware and software components used to facilitate storage for a system. A storage system can include multiple clusters of storage servers and other servers. A "storage server" refers to a computing device which can include multiple storage devices or storage drives. A "storage device" or a "storage drive" refers to a device or a drive with a non-volatile memory which can provide persistent storage of data, e.g., a solid state drive (SSD), a hard disk drive (HDD), or a flash-based storage device.

A "computing device" refers to any server, device, node, entity, drive, or any other entity which can provide any computing capabilities.

A "mapping table" table refers to a table which stores a mapping of logical addresses (such as logical block addresses) to physical addresses (such as physical block addresses).

The term "redundant protection" refers to the page-level protection of storing LBAs with a given physical page and the block-level protection of storing an LBA journal/log corresponding to the data stored in the pages of a given block.

Architecture of Exemplary System in the Prior Art

A conventional log-structure distributed file system can operate in a cluster with multiple nodes and can store several copies of data for high availability and data reliability. The data can be stored in large chunks, where a single chunk may contain data from multiple users or files. During operation, the system can delete data, which can result in a single chunk containing both invalid and valid data, and an increasingly large amount of invalid data. Furthermore, as described above, in a log-structured distributed file system, data is written sequentially and in a circular fashion to a storage media, generally without support for in-place overwrites. The write pointer can move until the end of the capacity of the storage media, and can loop back to the beginning to continue writing data, which can result in scattered data chunks with holes or gaps of data in the storage media. The file system may frequently compact the data chunks with holes in order to more efficiently utilize the capacity of the storage media, e.g., to free up storage capacity.

FIG. 1 illustrates an architecture of an exemplary distributed file system 102, in accordance with the prior art. System 100 can include data stored in non-volatile memory of a storage device. The data can be stored as multiple copies or replicas. For example, the system can store three copies of a data chunk A (copy 1 112, copy 2 122, and copy 3 132). Each data chunk A can include valid and invalid data portions, and during a compaction procedure, the system can retrieve the valid data portions from at least one copy of data chunk 1, store the retrieved valid data (i.e., in a storage device), generate new metadata for the retrieved valid data, and subsequently write the retrieved valid data to new or available data chunks For example, the system can retrieve valid data 136 from data chunk A copy 3 132 (via a communication 180), and store retrieved valid data 136 as valid data 170 (e.g., in a volatile memory or data buffer, not shown). The system can write valid data 170 as several copies, e.g.: as valid data 172 to a data chunk B copy 1 142 (via a communication 182); as valid data 174 to a data chunk B copy 2 152 (via a communication 184); and as valid data 176 to a data chunk B copy 3 162 (via a communication 186).

At the file system level, new metadata is generated for these copy operations, and new logical block addresses (LBAs) are assigned to the respectively copied data. These operations can result in an increased write amplification. At the storage device level (e.g., at an SSD level), a significant amount of data is moved from one physical location to another, which can increase the wear-leveling of the storage media. At the same time, metadata is stored in the non-volatile memory, and can consume resources at both the firmware and hardware level. The consistency of the metadata is essential to provide sufficient reliability for the SSD in handling the risk of data loss. Thus, reducing both the write amplification and the risk of data loss can be important features of an overall storage system.

Exemplary Storage Server in a Distributed File System

Figure 2:
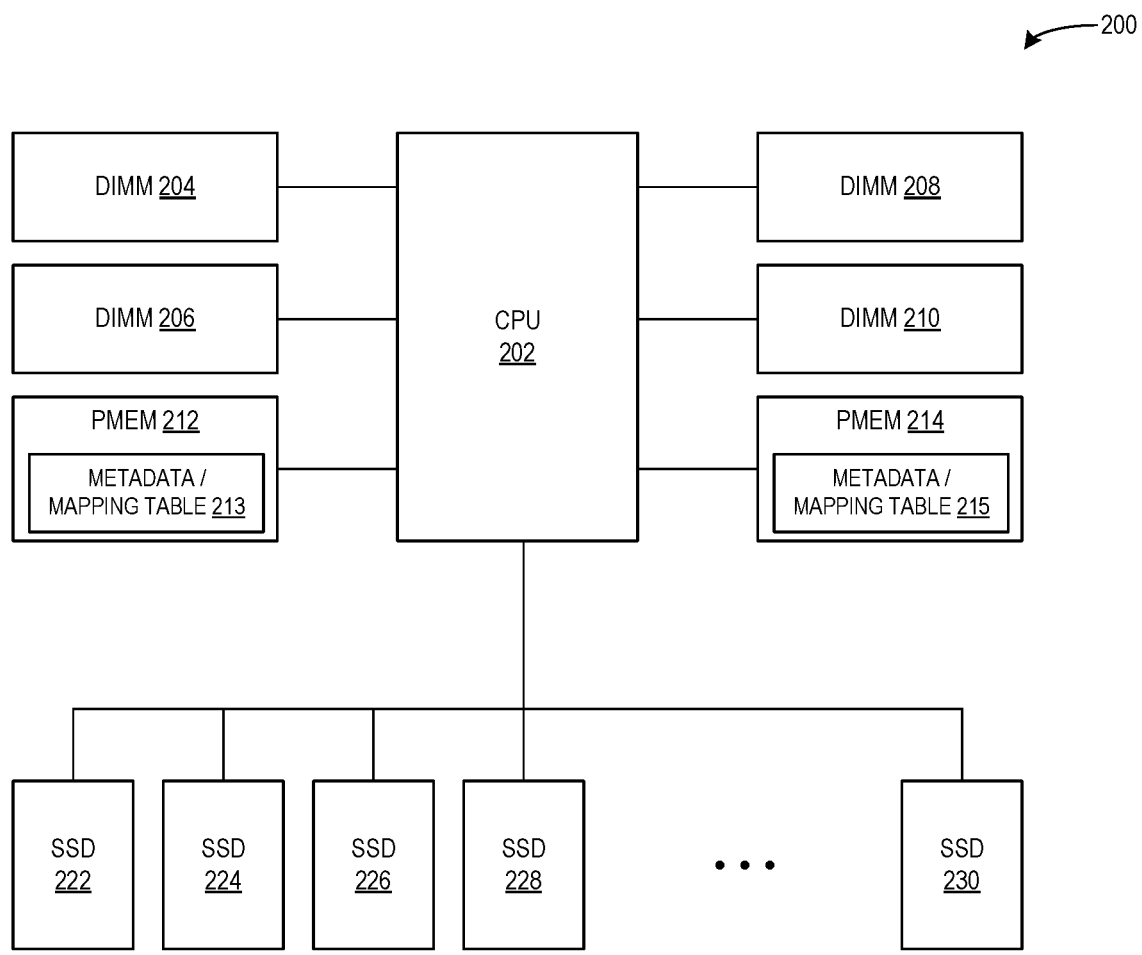
FIG. 2 illustrates an architecture of an exemplary distributed file system, including a storage server, in accordance with an embodiment of the present application.

FIG. 2 illustrates an architecture of an exemplary distributed file system, including a storage server 200, in accordance with an embodiment of the present application. Storage server 200 can include: a central processing unit (CPU) 202; dual in-line memory modules (DIMMs) 204, 206, 208, and 210; persistent memory (PMEM) 212, which can store metadata/mapping table 213; PMEM 214, which can store metadata/mapping table 215; and SSDs 222, 224, 226, 228, and 230. CPU 202 can be coupled to or communicate with DIMMs 204-210 and PMEMs 212 and 214. CPU 202 can also be coupled to or communicate with SSDs 222-230.

PMEMs 212 and 214 can be, e.g., PCM, ReRAM, and MRAM, and can support in-place overwrites. PMEMs 212 and 214 can include an enlarged memory capacity sufficient to store the metadata for SSDs 222-330, which can be high-capacity storage drives. By storing the metadata and mapping table information, PMEMs 212 and 214 can provide sufficient performance for the non-volatile memory as the system memory, rather than using the high-cost and volatile DRAM to store and manage metadata and mapping table information, as in the conventional distributed file system of FIG. 1.

Figure 3:
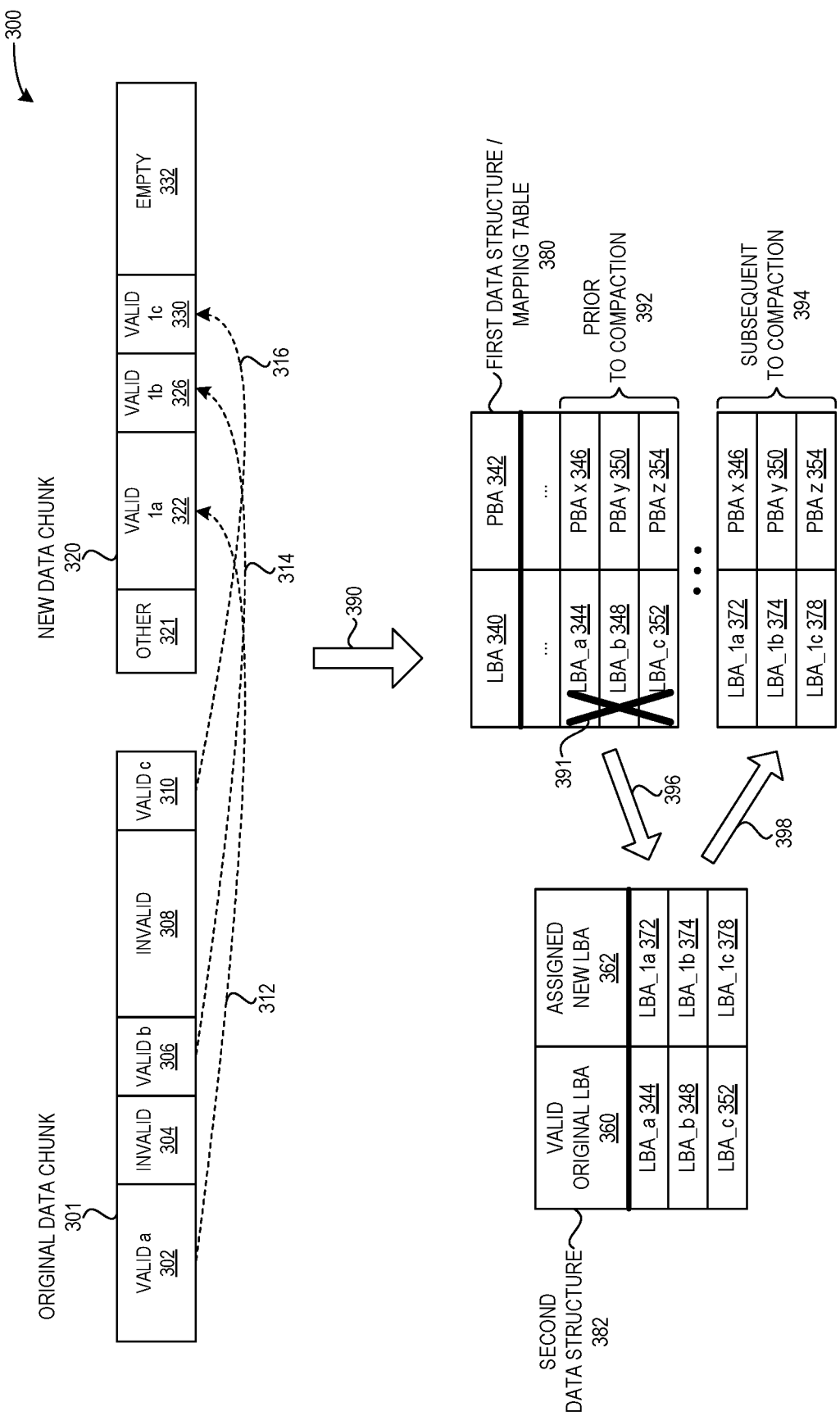
FIG. 3 illustrates an exemplary environment for compaction of a data chunk without data movement, in accordance with an embodiment of the present application.

Compaction of a Data Chunk without Data Movement; Mapping Tables; Removal of Redundant Protection FIG. 3 illustrates an exemplary environment 300 for compaction of a data chunk without data movement, in accordance with an embodiment of the present application. Environment 300 can include an original data chunk 301, a new data chunk 320, a first data structure/mapping table 380, and a second data structure 382. A data chunk can be or indicate a logical chunk which includes a set of LBAs. Original data chunk 301 can include valid and invalid data portions, e.g.: a valid "a" portion 302; an invalid portion 304; a valid "b" portion 306; an invalid portion 308; and a valid "c" portion 310. Data in original data chunk 301 can be associated with original valid LBAs, as indicated by, e.g., a, b, and c of valid data portions 302, 306, and 310, respectively. New data chunk 320 can include valid and invalid data portions, as well as other data and empty or available space, e.g.: other data 321; a valid "1a" portion 322; a valid "1b" portion 326; a valid "1c" portion 330; and an empty portion 332.

The system can identify original data chunk 301 as a chunk for compaction, and can copy out the valid data portions from original data chunk 301 to new data chunk 320. The system can assign a new LBA for valid data portions which have a corresponding original LBA. The system can copy valid data portions 302, 306, and 310 to new data chunk 320, where the system can maintain the same physical location (e.g., original PBA) for the data, and can map the original PBA to the assigned new LBA. For example, the system can assign new LBAs of 1a, 1b, and 1c to the original LBAs a, b, and c, and can move or organize valid data 302, 306, and 310 to be associated with or included in new data chunk 320 as valid data 322, 326, and 330 (via, respectively, data movements or communications 312, 314, and 316).

Thus, first data structure/mapping table 380 can include entries which map an LBA 340 to a PBA 342. Prior to a compaction 390, mapping table 380 can include entries mapping the original LBAs a, b, and c to the original PBAs x, y, and z, i.e.: mapping LBA_a 344 to PBA x 346; mapping LBA_b 348 to PBA y 350; and mapping LBA_c 352 to PBA z 354 (as indicated by the portion of mapping table 380 marked as "prior to compaction 392"). The PBA is the original PBA, which does not change when data is compacted, while the LBA is initially the "original LBA" (e.g., at a time prior to compaction) and is subsequently replaced with the corresponding "new LBA," based on information stored in first data structure 380 as well as information stored in second data structure 382. Second data structure 382 can be considered an interim data structure and can include entries which map the "original LBA" to the "new LBA." The original LBA can thus act as a bridge between first data structure/mapping table 380 (prior to compaction 392) and the first data structure/mapping table 380 (subsequent to compaction 394).

For example, the system can determine, as part of a compaction procedure, to move valid data portions with original LBAs a, b, and c (as indicated by a crossed-out X 391). The system can assign and map new LBAs 1a, 1b, and 1c to corresponding original LBAs a, b, and c (via a communication or operation 396). Second data structure 382 can store these mappings, i.e.: mapping LBA_a 344 to LBA_1a 372; mapping LBA_b 348 to LBA_1b 374; and mapping LBA_c 352 to LBA_1c 378. The system can "merge" first data structure/mapping table 380 (prior to compaction 392) with second data structure 382, to obtain first data structure/mapping table 380 (subsequent to compaction 394) (via a communication or operation 398), thus configuring the mapping relation between the new LBAs and the original PBAs, i.e.: mapping LBA_1a 372 to PBA x 346; mapping LBA_1b 374 to PBA y 350; and mapping LBA_1c 378 to PBA z 354. The system can store mapping table 380 in persistent memory, as described above in relation to FIG. 2.

Because the system stores mapping table 380 in a non-volatile memory of the host (as depicted above in relation to PMEMs 212 and 214 of FIG. 2), the system can eliminate the redundant protection generally used to store mapping information in a distributed file system. This redundant protection involves storing, in a physical page, LBAs corresponding to data stored in the same physical page, and further involves storing LBAs associated with a plurality of physical pages of a NAND block in an LBA log in the NAND block.

Figure 4:
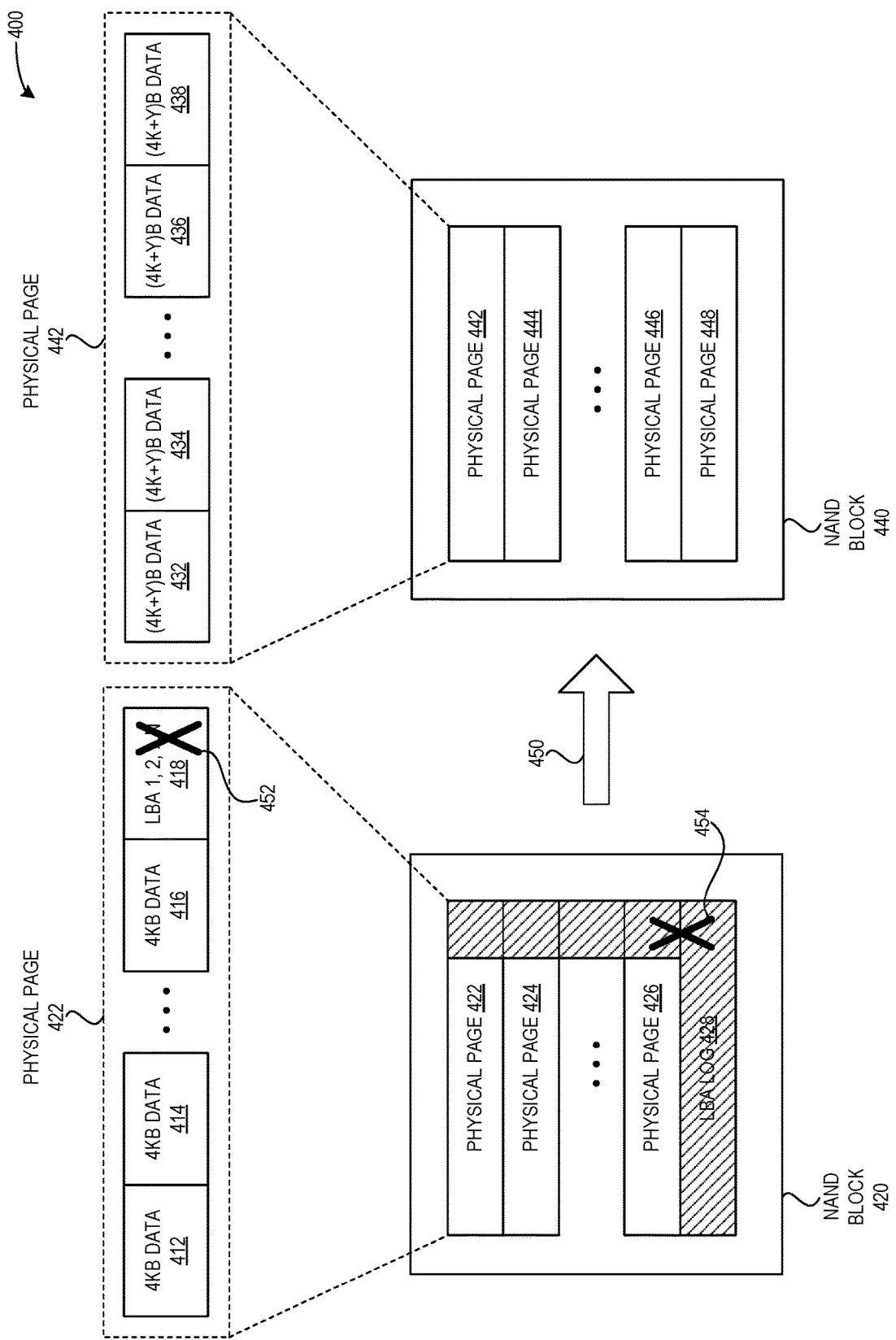
FIG. 4 illustrates an environment with removal of redundant protection to support a variable data sector, in accordance with an embodiment of the present application.

FIG. 4 illustrates an environment 400 with removal of redundant protection to support a variable data sector, in accordance with an embodiment of the present application. Environment 400 can include a NAND block 420, which stores a plurality of physical pages 422, 424, and 426, and an LBA log 428. Each physical page can also store LBAs for the given page. For example, physical page 422 can include: a 4 KB data 412; a 4 KB data 414; a 4 KB data 416; and LBA 1, 2, . . . , N 418, which can include LBAs corresponding to data 412-416. NAND block 420 depicts the space occupied by the redundant protection (indicated by left-slanting diagonal lines).

The embodiments described herein can provide an improvement 450 to the organization of data stored in NAND block 420. NAND block 440 can include physical pages 442, 444, 446, and 448. Physical page 442 can include: (4K+Y)B data 432; (4K+Y)B data 434; (4K+Y)B data 436; and (4K+Y)B data 438. The "Y" represents the space gained by removing the page-wise LBA protection (indicated by a bold X 452), which can be seen in the additional Y bytes of space in each data portion, as well as the additional data portion(s) 438. In addition, the removal of the LBA log, along with space gained by removal of the page-wise LBA protection, can result in even more space gained (e.g., cumulative space indicated by a bold X 454). As a result, NAND block 440 can include physical pages 442-448, where the number of total physical pages available to store data in NAND block 440 is greater than the number of total physical pages available to store data in NAND block 420. Moreover, the additional Y bytes for each data portion in physical page 442 of NAND block 440 can provide support for a sectors of variable sizes, e.g., each sector can include 4096+Y bytes for each sector.

Exemplary Communication for Writing Data and Metadata

Figure 5:
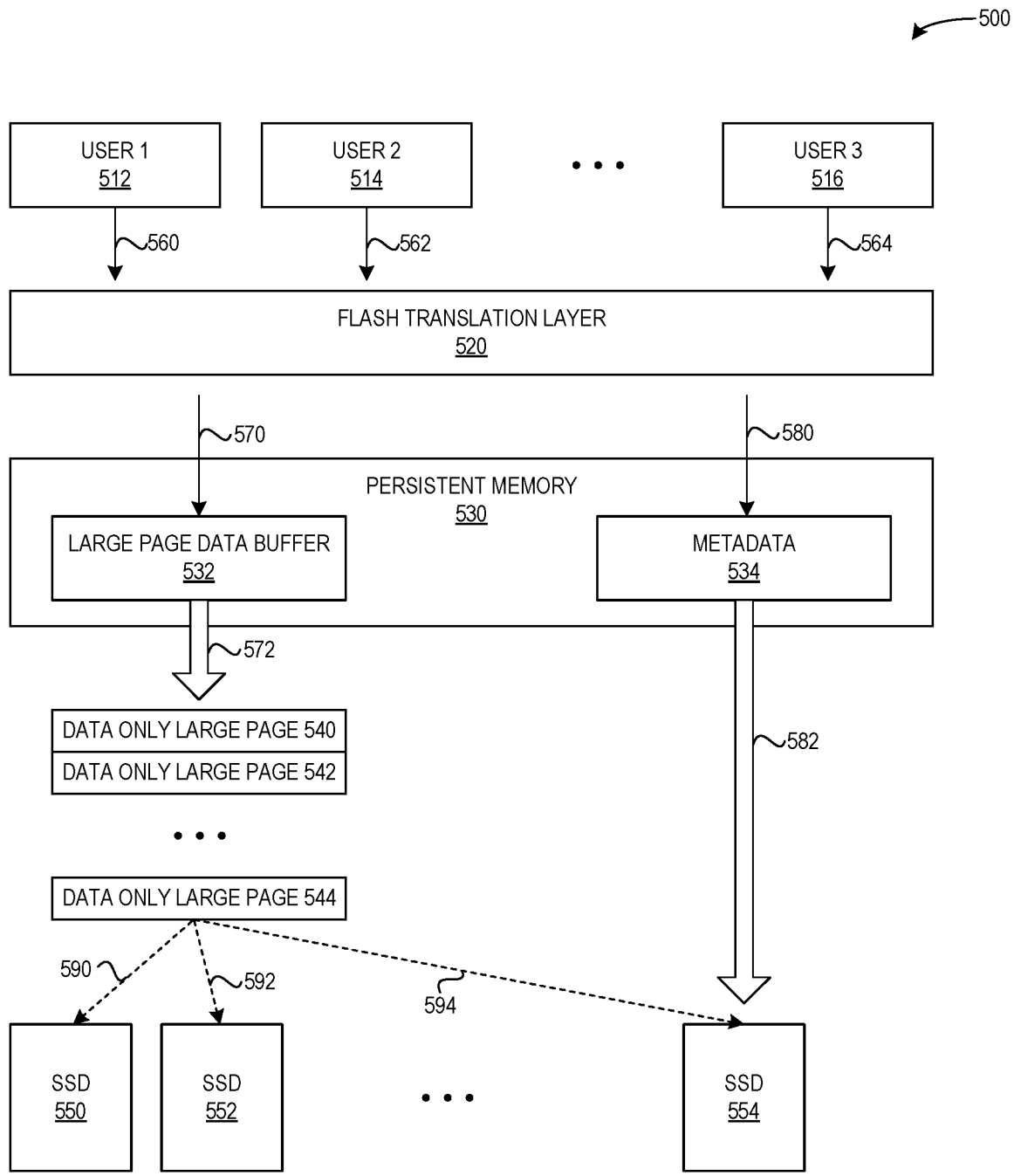
FIG. 5 illustrates an exemplary environment and communication for writing data and metadata, in accordance with an embodiment of the present application.

FIG. 5 illustrates an exemplary environment 500 and communication for writing data and metadata, in accordance with an embodiment of the present application. During operation, multiple users 1 512, 2 514, and 3 516 can issue I/O requests and send data, via, respectively, communications 560, 562, and 564, to be written to a non-volatile memory (e.g., SSDs 550-554). A flash translation layer 520 associated with a host can receive the data and accumulate the data (via a communication 570) in a large page data buffer 532 in persistent memory 530 until the data fills a large physical page of a predetermined size. Recall that persistent memory 530 is a non-volatile memory of the host. As the system accumulates filled physical pages (e.g., data only large pages 540, 542, and 544), the system can write each filled physical page to one or more of SSDs 550, 552, and 554 (via, respectively, communications 590, 592, and 594.

At the same time, flash translation layer 520 can generate metadata for the received data and store the generated metadata in the non-volatile memory of the host (e.g., as metadata 534 in persistent memory 530 of the host). The system can continuously update metadata 534 (which can include a first data structure/mapping table 380 as from FIG. 3) in persistent memory 530, by using the in-place write and bridging/merging described above in relation to FIG. 3. Additionally, the system can periodically (e.g., based on a predetermined time period or interval) encrypt the stored metadata and flush a copy of the encrypted metadata to one of SSDs 550-554 (via a communication 582).

The system can perform the data writes of the data only large pages 540-544 (as in communications 590, 592, and 594) and the metadata encrypted write (as in communication 582) asynchronously from persistent memory 530 to SSDs 550-554. Thus, the system can decouple the capacity and bandwidth of the storage system, and of the overall distributed file system.

Method for Facilitating Organization of Data in a File System

Figure 6:
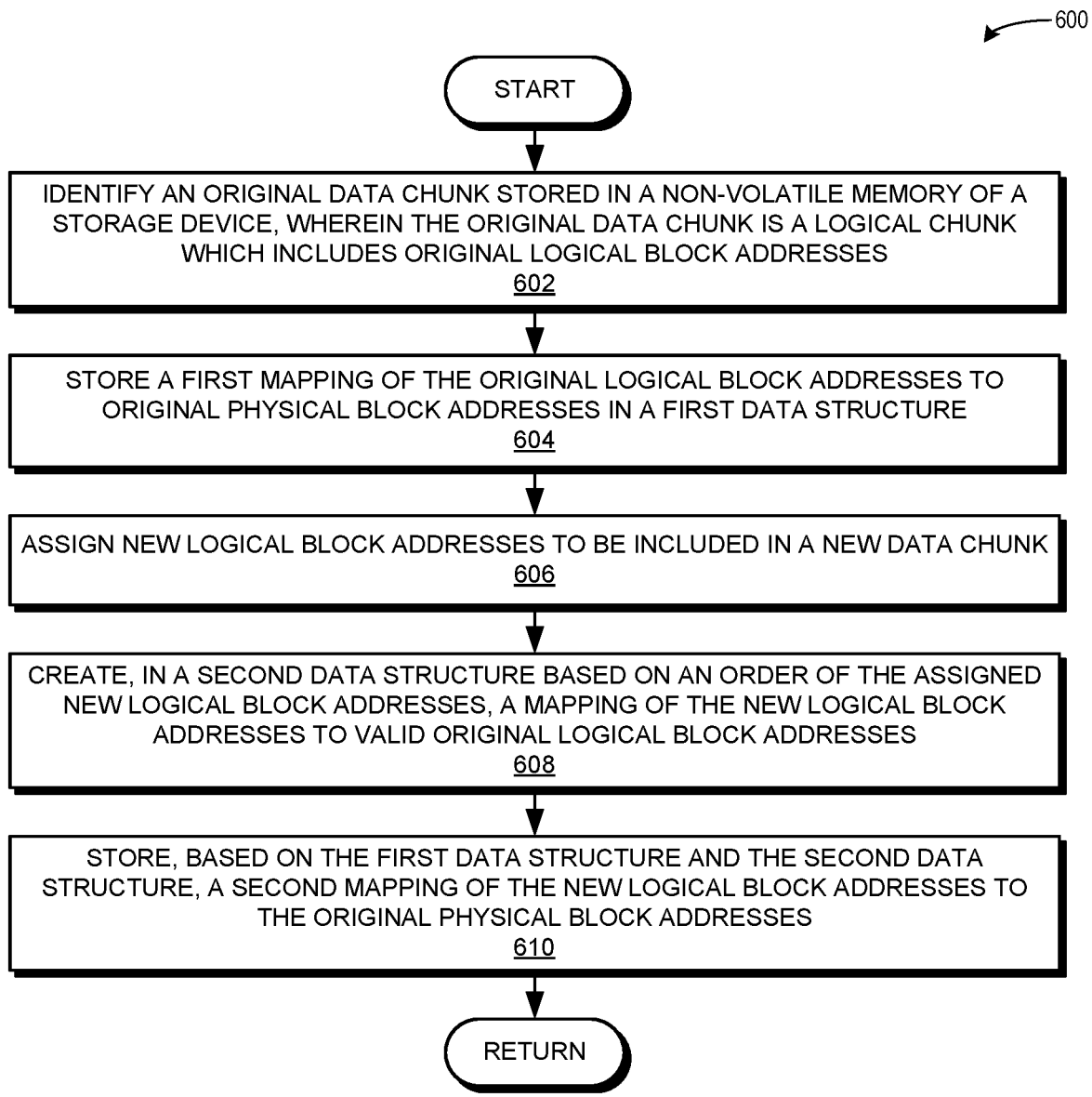
FIG. 6 presents a flowchart illustrating a method for facilitating organization of data, in accordance with an embodiment of the present application.

FIG. 6 presents a flowchart 600 illustrating a method for facilitating organization of data, in accordance with an embodiment of the present application. During operation, the system identifies an original data chunk stored in a non-volatile memory of a storage device, wherein the original data chunk is a logical chunk which includes original logical block addresses (operation 602). The system stores a first mapping of the original logical block addresses to original physical block addresses in a first data structure (operation 604). The system assigns new logical block addresses to be included in a new data chunk (operation 606). The system creates, in a second data structure based on an order of the assigned new logical block addresses, a mapping of the new logical block addresses to valid original logical block addresses (operation 608). The system stores, based on the first data structure and the second data structure, a second mapping of the new logical block addresses to the original physical block addresses (operation 610), and the operation returns.

Figure 7A:
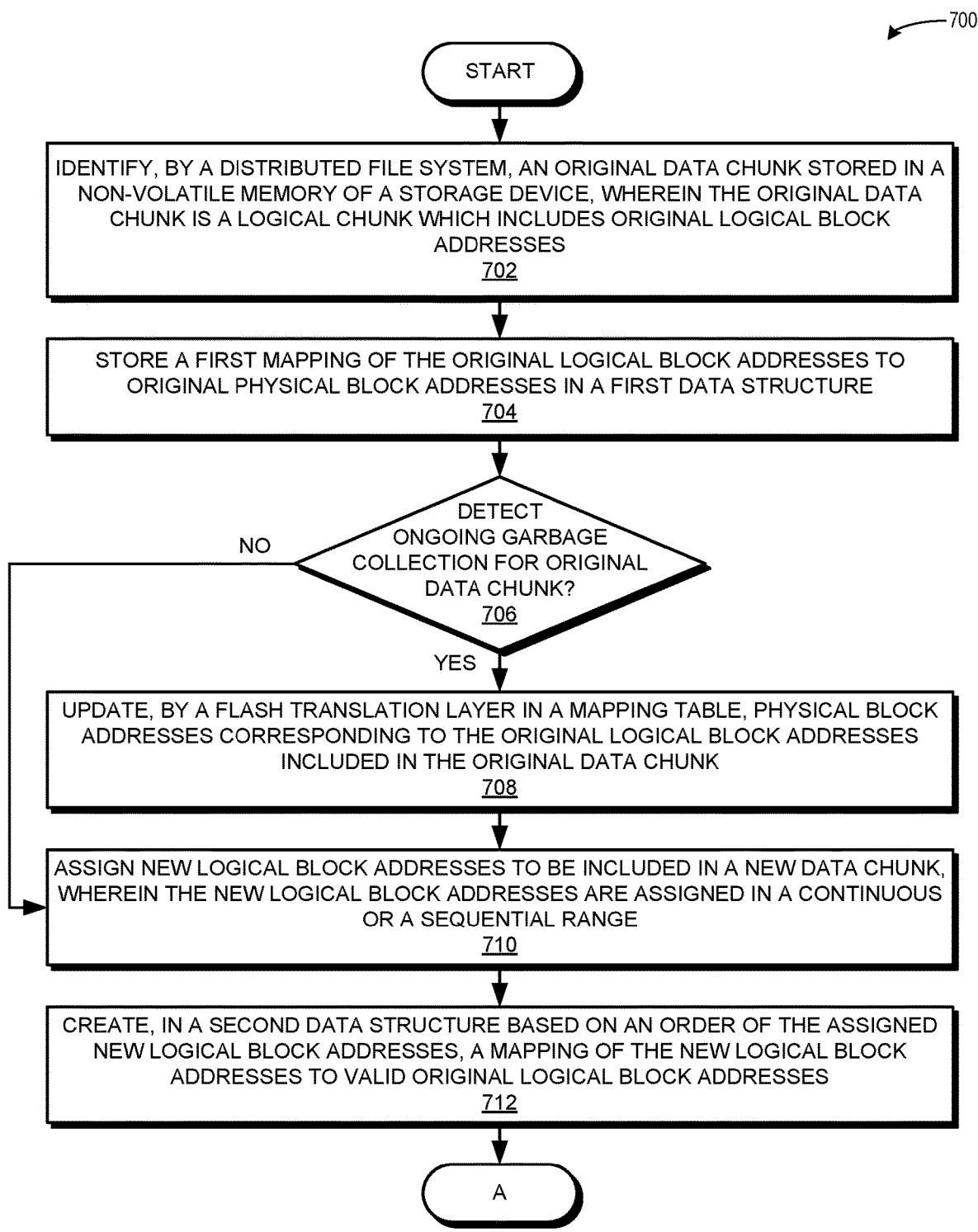
FIG. 7A presents a flowchart illustrating a method for facilitating organization of data, in accordance with an embodiment of the present application.

FIG. 7A presents a flowchart 700 illustrating a method for facilitating organization of data, in accordance with an embodiment of the present application. During operation, the system identifies, by a distributed file system, an original data chunk stored in a non-volatile memory of a storage device, wherein the original data chunk is a logical chunk which includes original logical block addresses (operation 702). The system can determine valid original logical block addresses included in the original data chunk, and can also determine invalid original logical block addresses included in the original data chunk (not shown). The system stores a first mapping of the original logical block addresses to original physical block addresses in a first data structure (operation 704). If the system detects an ongoing garbage collection process associated with the identified original data chunk (decision 706), the system updates, by a flash translation layer in a mapping table, physical block addresses corresponding to the original logical block addresses included in the original data chunk (operation 708), and the operation continues at operation 710. The mapping table can be the first data structure.

If the system does not detect an ongoing garbage collection process associated with the identified original data chunk (decision 706), the system assigns new logical block addresses to be included in a new data chunk, wherein the new logical block addresses are assigned in a continuous or a sequential range (operation 710). The system creates, in a second data structure based on an order of the assigned new logical block addresses, a mapping of the new logical block addresses to valid original logical block addresses (operation 712). The system can create the mapping of the new LBAs to the valid original LBAs by: arranging the valid original logical block addresses to align with the assigned new logical block addresses; and mapping a respective valid original logical block address to an aligned respective new logical block address (not shown). The operation continues at Label A of FIG. 7B.

Figure 7B:
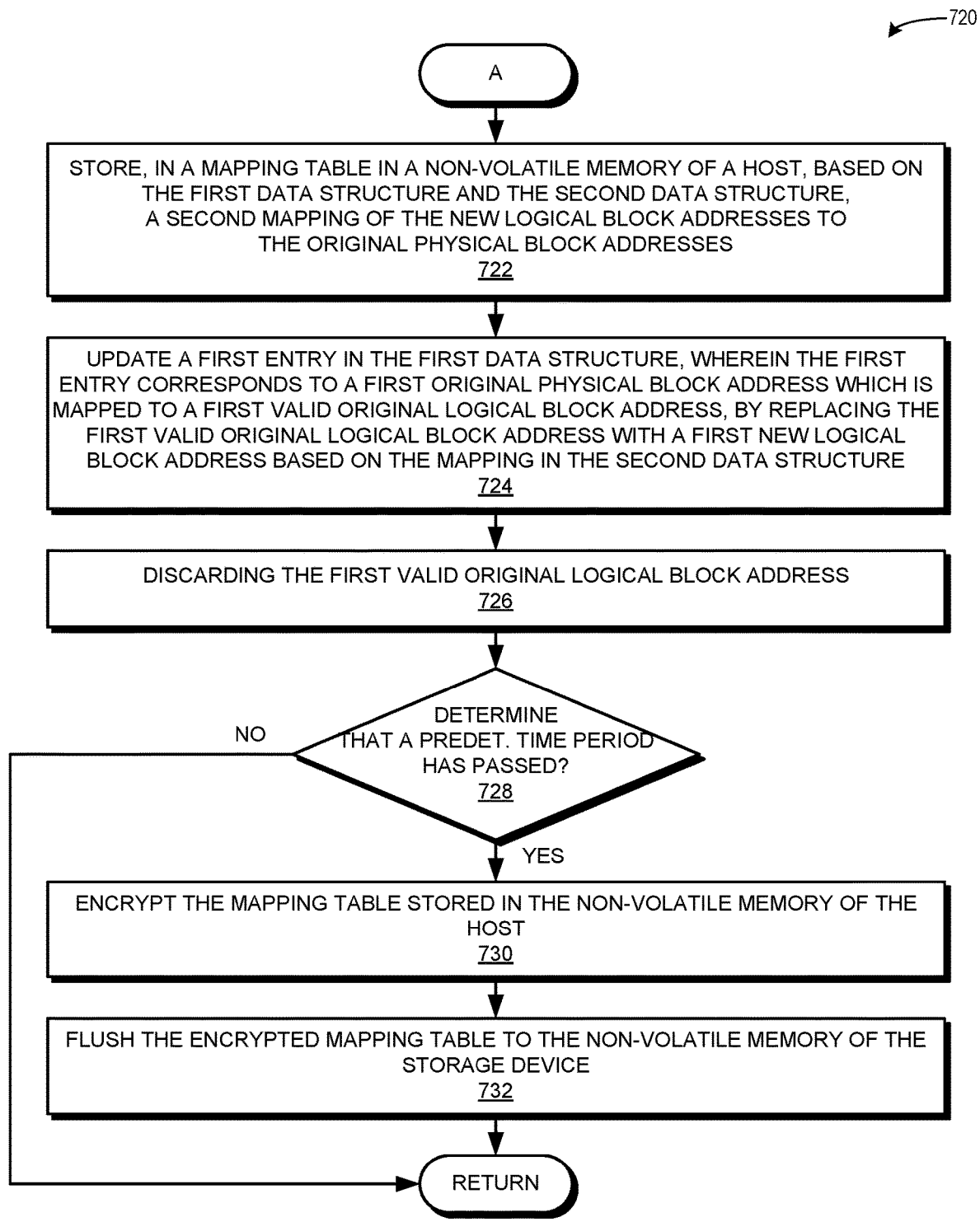
FIG. 7B presents a flowchart illustrating a method for facilitating organization of data, in accordance with an embodiment of the present application.

FIG. 7B presents a flowchart 720 illustrating a method for facilitating organization of data, in accordance with an embodiment of the present application. The system stores, in a mapping table in a non-volatile memory of a host, based on the first data structure and the second data structure, a second mapping of the new logical block addresses to the original physical block addresses (operation 722). The system updates a first entry in the first data structure, wherein the first entry corresponds to a first original physical block address which is mapped to a first valid original logical block address, by replacing the first valid original logical block address with a first new logical block address based on the mapping in the second data structure (operation 724). The system discards the first valid original logical block address (operation 726).

If the system determines that a predetermined time period has not passed (decision 728), the operation returns. If the system determines that the predetermined time period has passed (decision 728), the system encrypts the mapping table stored in the non-volatile memory of the host (operation 730), and flushes the encrypted mapping table to the non-volatile memory of the storage device (operation 732). The operation returns.

Exemplary Computer System and Apparatus

Figure 8:
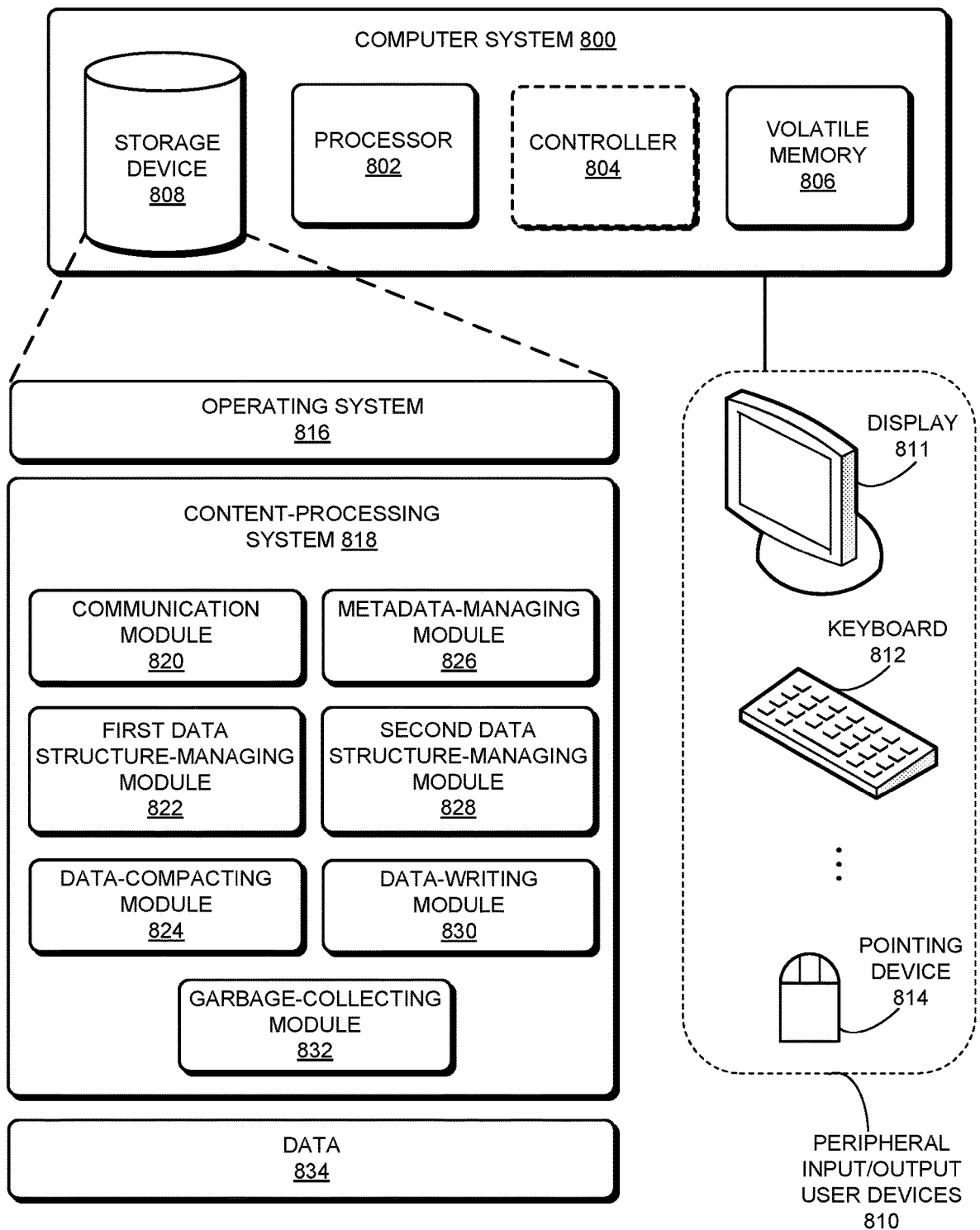
FIG. 8 illustrates an exemplary computer system that facilitates organization of data, in accordance with an embodiment of the present application.

FIG. 8 illustrates an exemplary computer system 800 that facilitates organization of data, in accordance with an embodiment of the present application. Computer system 800 includes a processor 802, a volatile memory 806, and a storage device 808. In some embodiments, computer system 800 can include a controller 804 (indicated by the dashed lines). Volatile memory 806 can include, e.g., random access memory (RAM), that serves as a managed memory, and can be used to store one or more memory pools. Storage device 808 can include persistent storage which can be managed or accessed via processor 802 (or controller 804). Furthermore, computer system 800 can be coupled to peripheral input/output (I/O) user devices 810, e.g., a display device 811, a keyboard 812, and a pointing device 814. Storage device 808 can store an operating system 816, a content-processing system 818, and data 836.

Content-processing system 818 can include instructions, which when executed by computer system 800, can cause computer system 800 or processor 802 to perform methods and/or processes described in this disclosure. Specifically, content-processing system 818 can include instructions for receiving and transmitting data packets, including data to be read or written, an input/output (I/O) request (e.g., a read request or a write request), metadata, a logical block address (LBA), and a physical block address (PBA) (communication module 820).

Content-processing system 818 can further include instructions for identifying an original data chunk stored in a non-volatile memory of a storage device, wherein the original data chunk is a logical chunk which includes original logical block addresses (data-compacting module 824). Content-processing system 818 can include instructions for storing a mapping of the original logical block addresses to original physical block addresses in a first data structure (first data structure-managing module 822). Content-processing system 818 can include instructions for assigning new logical block addresses to be included in a new data chunk (metadata-managing module 826). Content-processing system 818 can also include instructions for creating, in a second data structure based on an order of the assigned new logical block addresses, a mapping of the new logical block addresses to valid original logical block addresses (second data structure-managing module 828). Content-processing system 818 can include instructions for storing, based on the first data structure and the second data structure, a mapping of the new logical block addresses to the original physical block addresses (first data structure-managing module 822, second data structure-managing module 828, and metadata-managing module 826).

Content-processing system 818 can additionally include instructions for, in response to determining that a predetermined time period has passed: encrypting the mapping table stored in the non-volatile memory of the host (metadata-managing module 826); and flushing the encrypted mapping table to the non-volatile memory of the storage device (data-writing module 830). Content-processing system 818 can include instructions for detecting an ongoing garbage collection process associated with the identified original data chunk (garbage-collecting module 832). Content-processing system 818 can also include instructions for updating, by a flash translation layer in the mapping table, physical block addresses corresponding to the original logical block addresses included in the original data chunk (metadata-managing module 826).

Content-processing system 818 can further include instructions for receiving, by a distributed file system, multiple data from multiple users to be written to non-volatile memory of a plurality of storage devices (communication module 820). Content-processing system 818 can include instructions for generating, by a flash translation layer, metadata associated with the multiple data (metadata-managing module 826). Content-processing system 818 can include instructions for storing the generated metadata in a non-volatile memory of the host (data-writing module 830). Content-processing system 818 can include instructions for accumulating the multiple data in a data buffer of the non-volatile memory of the host to fill a large physical page of a predetermined size (data-writing module 830). Content-processing system 818 can also include instructions for writing the filled large physical page to the non-volatile memory of at least one of the plurality of storage devices (data-writing module 830). Content-processing system 818 can include instructions for, in response to determining that a predetermined time period has passed, flushing an encrypted copy of the metadata to the non-volatile memory of a first storage device (metadata-managing module 826 and data-writing module 830).

Data 834 can include any data that is required as input or generated as output by the methods and/or processes described in this disclosure. Specifically, data 834 can store at least: data; a request; a data chunk; a logical chunk; a logical data chunk with a logical block address; a logical block address (LBA); a physical block address (PBA); an original or a newly assigned/allocated LBA; a first data structure, which stores a mapping of original LBAs to original LBAs; a second data structure, which stores a mapping of new LBAs to valid original LBAs; a mapping of new LBAs to original PBAs; a mapping table; a predetermined period of time; encrypted data; an encrypted mapping table; an entry; an updated entry; a discarded LBA; an indicator of an ongoing garbage collection process associated with a data chunk; an indicator or identifier of a flash translation layer, a distributed file system, or a buffer; LBAs which are assigned in a continuous or sequential range; valid LBAs which are aligned with assigned new LBAs; a mapping table which is the result of merging a first and a second data structure; a bridge between two data structures; a physical page of data; a large physical page of data; a block of data; multiple data received from multiple users; metadata; accumulated data; and an encrypted copy of metadata or other data.

Figure 9:
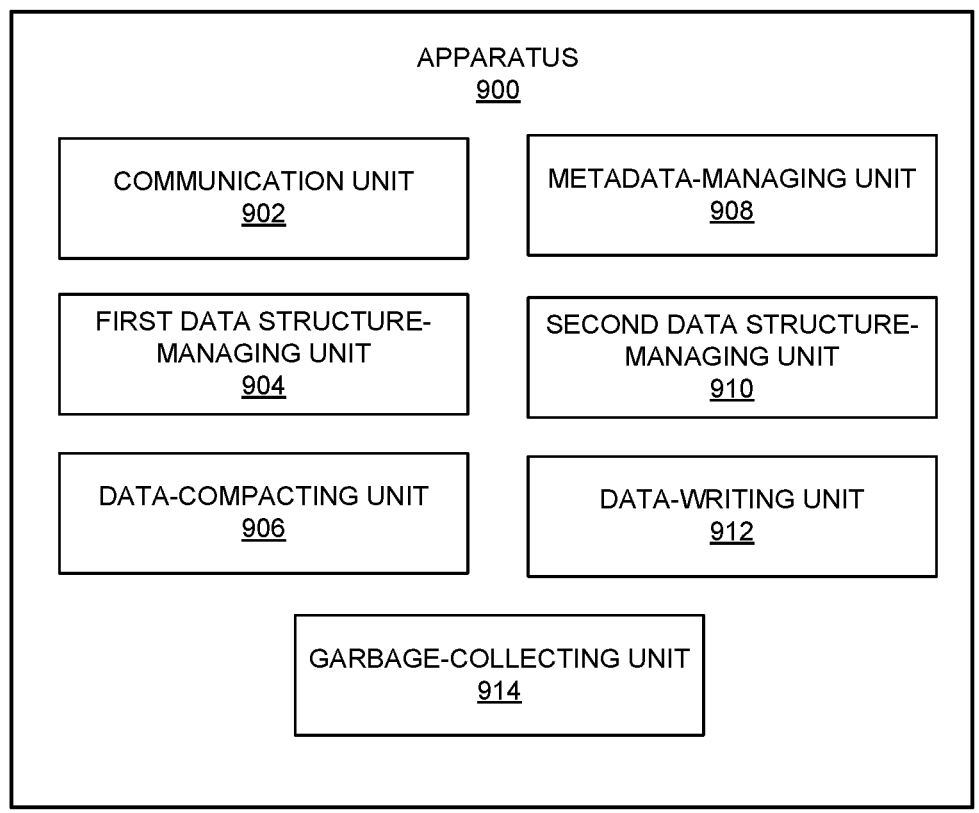
FIG. 9 illustrates an exemplary apparatus that facilitates organization of data, in accordance with an embodiment of the present application.

FIG. 9 illustrates an exemplary apparatus 900 that facilitates organization of data, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Furthermore, apparatus 900 may be integrated in a computer system, or realized as a separate device or devices capable of communicating with other computer systems and/or devices.

Apparatus 900 can comprise modules or units 902-914 which are configured to perform functions or operations similar to modules 820-832 of computer system 800 of FIG. 8, including: a communication unit 902; a first data structure-managing unit 904; a data-compacting unit 906; a metadata-managing unit 908; a second data structure-managing unit 910; a data-writing unit 912; and a garbage-collection unit 914.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
receiving, by a distributed file system, multiple data from multiple users to be written to non-volatile memory of a plurality of storage devices;
generating, by a flash translation layer, metadata associated with the multiple data;
storing the generated metadata in a non-volatile memory of a host;
accumulating the multiple data in a data buffer of the non-volatile memory of the host to fill a large physical page of a predetermined size;
writing the filled large physical page to the non-volatile memory of at least one of the plurality of storage devices;
in response to determining that a predetermined time period has passed, flushing an encrypted copy of the metadata to the non-volatile memory of a storage device;
identifying an original data chunk stored in the non-volatile memory of the storage device, wherein the original data chunk is a logical chunk which includes original logical block addresses;
storing, in the non-volatile memory of the host, a first mapping of the original logical block addresses to original physical block addresses in a first data structure;
assigning new logical block addresses to be included in a new data chunk;
creating, in a second data structure based on an order of the assigned new logical block addresses, a mapping of the new logical block addresses to valid original logical block addresses; and
storing, based on the first data structure and the second data structure, a second mapping of the new logical block addresses to the original physical block addresses.

2. The method of claim 1, wherein the method is performed by the distributed file system as part of a compaction procedure.

3. The method of claim 1, wherein the assigned new logical block addresses are assigned in a continuous or sequential range.

4. The method of claim 1, wherein creating, in the second data structure based on the assigned new logical block addresses, the mapping of the new logical block addresses to the valid original logical block addresses comprises:
arranging the valid original logical block addresses to align with the assigned new logical block addresses; and
mapping a respective valid original logical block address to an aligned respective new logical block address.

5. The method of claim 1, wherein storing the second mapping of the new logical block addresses to the original physical block addresses further comprises:
merging the first data structure and the second data structure to create a bridge between the new logical block addresses and the original physical block addresses through the original logical block addresses.

6. The method of claim 1,
wherein data is stored in the non-volatile memory of the storage device in physical pages in a block of data of the non-volatile memory of the storage device,
wherein a physical page does not include logical block addresses which correspond to data stored in the physical page, and
wherein the block does not include a log of logical block addresses which correspond to data stored in the physical pages of the block.

7. The method of claim 1, wherein the second mapping of the new logical block addresses to the original physical block addresses is stored in a mapping table in the non-volatile memory of the host.

8. The method of claim 7, further comprising:
in response to determining that the predetermined time period has passed:
encrypting the mapping table stored in the non-volatile memory of the host; and
flushing the encrypted mapping table to the non-volatile memory of the storage device.

9. The method of claim 7, wherein the mapping table comprises the first data structure, and wherein storing the second mapping of the new logical block addresses to the original physical block addresses comprises:
updating a first entry in the first data structure, wherein the first entry corresponds to a first original physical block address which is mapped to a first valid original logical block address, by replacing the first valid original logical block address with a first new logical block address based on the mapping in the second data structure; and
discarding the first valid original logical block address.

10. The method of claim 7, wherein prior to creating, in the second data structure based on the assigned new logical block addresses, the mapping of the new logical block addresses to the valid original logical block addresses, the method further comprises:
detecting an ongoing garbage collection process associated with the identified original data chunk; and
updating, by a flash translation layer in the mapping table, physical block addresses corresponding to the original logical block addresses included in the original data chunk.

11. A computer system, comprising:
a processor; and
a memory coupled to the processor and storing instructions which, when executed by the processor, cause the processor to perform a method, the method comprising:
receiving, by a distributed file system, multiple data from multiple users to be written to non-volatile memory of a plurality of storage devices;
generating, by a flash translation layer, metadata associated with the multiple data;
storing the generated metadata in a non-volatile memory of a host;
accumulating the multiple data in a data buffer of the non-volatile memory of the host to fill a large physical page of a predetermined size;
writing the filled large physical page to the non-volatile memory of at least one of the plurality of storage devices;
in response to determining that a predetermined time period has passed, flushing an encrypted copy of the metadata to the non-volatile memory of a storage device;
identifying an original data chunk stored in the non-volatile memory of the storage device, wherein the original data chunk is a logical chunk which includes original logical block addresses;
storing, in the non-volatile memory of the host, a first mapping of the original logical block addresses to original physical block addresses in a first data structure;
assigning new logical block addresses to be included in a new data chunk;
creating, in a second data structure based on an order of the assigned new logical block addresses, a mapping of the new logical block addresses to valid original logical block addresses; and
storing, based on the first data structure and the second data structure, a second mapping of the new logical block addresses to the original physical block addresses.

12. The computer system of claim 11,
wherein the method is performed by the distributed file system as part of a compaction procedure,
wherein the assigned new logical block addresses are assigned in a continuous or sequential range,
wherein data is stored in the non-volatile memory of the storage device in physical pages in a block of data of the non-volatile memory of the storage device,
wherein a physical page does not include logical block addresses which correspond to data stored in the physical page, and
wherein the block does not include a log of logical block addresses which correspond to data stored in the physical pages of the block.

13. The computer system of claim 11, wherein storing the second mapping of the new logical block addresses to the original physical block addresses further comprises:
merging the first data structure and the second data structure to create a bridge between the new logical block addresses and the original physical block addresses through the original logical block addresses.

14. The computer system of claim 11, wherein the second mapping of the new logical block addresses to the original physical block addresses is stored in a mapping table in the non-volatile memory of the host.

15. The computer system of claim 14, wherein the method further comprises:
in response to determining that the predetermined time period has passed:
encrypting the mapping table stored in the non-volatile memory of the host; and
flushing the encrypted mapping table to the non-volatile memory of the storage device.

16. The computer system of claim 14, wherein the mapping table comprises the first data structure, and wherein storing the second mapping of the new logical block addresses to the original physical block addresses comprises:

updating a first entry in the first data structure, wherein the first entry corresponds to a first original physical block address which is mapped to a first valid original logical block address, by replacing the first valid original logical block address with a first new logical block address based on the mapping in the second data structure; and discarding the first valid original logical block address.

17. The computer system of claim 14, wherein prior to creating, in the second data structure based on the assigned new logical block addresses, the mapping of the new logical block addresses to the valid original logical block addresses, the method further comprises:

detecting an ongoing garbage collection process associated with the identified original data chunk; and updating, by a flash translation layer in the mapping table, physical block addresses corresponding to the original logical block addresses included in the original data chunk.

18. A non-transitory computer-readable storage medium storing instructions that when executed by a computer cause the computer to perform a method, the method comprising:

receiving, by a distributed file system, multiple data from multiple users to be written to non-volatile memory of a plurality of storage devices;

generating, by a flash translation layer, metadata associated with the multiple data;

storing the generated metadata in a non-volatile memory of a host;

accumulating the multiple data in a data buffer of the non-volatile memory of the host to fill a large physical page of a predetermined size;

writing the filled large physical page to the non-volatile memory of at least one of the plurality of storage devices;

in response to determining that a predetermined time period has passed, flushing an encrypted copy of the metadata to the non-volatile memory of a storage device;

identifying an original data chunk stored in the non-volatile memory of the storage device, wherein the original data chunk is a logical chunk which includes original logical block addresses;

storing, in the non-volatile memory of the host, a first mapping of the original logical block addresses to original physical block addresses in a first data structure;

assigning new logical block addresses to be included in a new data chunk;

creating, in a second data structure based on an order of the assigned new logical block addresses, a mapping of the new logical block addresses to valid original logical block addresses; and storing, based on the first data structure and the second data structure, a second mapping of the new logical block addresses to the original physical block addresses.

\* \* \* \* \*